(12) United States Patent
Perriello

(10) Patent No.: US 7,314,548 B2
(45) Date of Patent: Jan. 1, 2008

(54) BIOVENTING REMEDIATION SYSTEM

(75) Inventor: Felix A. Perriello, Norwood, MA (US)

(73) Assignee: Global BioSciences, Inc., North Attleborough, MA (US)

(*) Notice: Subject to any disclaimer, the term of this patent is extended or adjusted under 35 U.S.C. 154(b) by 378 days.

(21) Appl. No.: 10/641,736

(22) Filed: Aug. 15, 2003

(65) Prior Publication Data
US 2005/0274670 A1     Dec. 15, 2005

Related U.S. Application Data

(60) Provisional application No. 60/403,934, filed on Aug. 16, 2002.

(51) Int. Cl.
*C02F 3/00*     (2006.01)

(52) U.S. Cl. .................. 210/170; 210/194; 210/220

(58) Field of Classification Search ............... 210/170, 210/194, 220
See application file for complete search history.

(56) References Cited

U.S. PATENT DOCUMENTS

| | | | |
|---|---|---|---|
| 3,846,290 A | 11/1974 | Raymond | |
| 4,713,343 A | 12/1987 | Wilson, Jr. et al. | |
| 5,006,250 A | 4/1991 | Roberts et al. | |
| 5,221,159 A | 6/1993 | Billings et al. | |
| 5,255,740 A * | 10/1993 | Talley | 166/272.3 |
| 5,277,518 A | 1/1994 | Billings et al. | |
| 5,277,815 A | 1/1994 | Beeman | |
| 5,302,286 A | 4/1994 | Semprini et al. | |
| 5,326,703 A | 7/1994 | Hazen et al. | |
| 5,384,048 A | 1/1995 | Hazen et al. | |
| 5,472,294 A | 12/1995 | Billings et al. | |
| 5,510,033 A | 4/1996 | Ensley et al. | |
| 5,512,479 A | 4/1996 | Steffan | |
| 5,516,688 A | 5/1996 | Rothmel | |
| 5,653,288 A * | 8/1997 | Billings et al. | 166/305.1 |
| 5,814,514 A | 9/1998 | Steffan et al. | |
| 5,888,396 A | 3/1999 | Perriello | |
| 5,958,757 A | 9/1999 | Steffan et al. | |
| 6,051,130 A | 4/2000 | Perriello | |
| 6,110,372 A | 8/2000 | Perriello | |
| 6,156,203 A | 12/2000 | Anthony | |
| 6,210,579 B1 | 4/2001 | Perriello | |
| 6,244,346 B1 | 6/2001 | Perriello | |

(Continued)

OTHER PUBLICATIONS http://mistupid.com/chemistry/aircomp.htm downloaded Mar. 20, 2007.*

(Continued)

*Primary Examiner*—Chester T. Barry
(74) *Attorney, Agent, or Firm*—Alan G. Towner, Esq.; Pietragallo Bosick & Gordon, LLP

(57) ABSTRACT

Bioventing systems create a bacterial treatment zone at a contaminated site by supplying a hydrocarbon food source to the treatment zone, and recirculating the hydrocarbon to the treatment zone. The bioventing systems may inject, circulate, extract and reinject hydrocarbons such as butane or other alkanes to the subsurface at a contaminated site to create a bacterial treatment zone. Contaminated vapors extracted from the soil and/or groundwater may be reintroduced into the site. Hydrocarbons that are not consumed by the bacteria in the treatment zone may be extracted and recovered for recirculation into the treatment zone.

9 Claims, 4 Drawing Sheets

U.S. PATENT DOCUMENTS

| | | | |
|---|---|---|---|
| 6,245,235 B1 | 6/2001 | Perriello | |
| 6,303,366 B1 | 10/2001 | Steffan et al. | |
| 6,361,694 B1 | 3/2002 | Trost | |
| 6,383,388 B1 | 5/2002 | Krauter et al. | |
| 6,461,510 B1* | 10/2002 | Boles et al. | 210/606 |
| 6,488,850 B2 | 12/2002 | Perriello | |
| 6,669,846 B2 | 12/2003 | Perriello | |
| 2001/0023847 A1 | 9/2001 | Perriello | |
| 2002/0066566 A1 | 6/2002 | Perriello | |
| 2002/0168738 A1* | 11/2002 | Yano et al. | 435/189 |
| 2002/0195389 A1 | 12/2002 | Perriello | |
| 2003/0015325 A1* | 1/2003 | Vienot | 166/401 |
| 2003/0034301 A1 | 2/2003 | Perriello | |
| 2003/0044966 A1 | 3/2003 | Perriello | |
| 2003/0062306 A1 | 4/2003 | Perriello | |
| 2003/0066322 A1 | 4/2003 | Perriello | |
| 2003/0084609 A1 | 5/2003 | Perriello et al. | |
| 2003/0136735 A1 | 7/2003 | Perriello | |
| 2003/0167686 A1 | 9/2003 | Perriello | |
| 2003/0201227 A1 | 10/2003 | Perriello | |

OTHER PUBLICATIONS

Wilson et al., "Biotransformation of Trichloroethylene in Soil," *Applied and Environmental Microbiology*, Jan. 1985, p. 242-243, vol. 49, No. 1.

Fogel et al., Biodegradation of Chlorinated Ethenes by Methane-Utilizing Mixed Culture, *Applied and Environmental Microbiology*, Apr. 1986, p. 720-724, vol. 51, No. 4.

Nelson et al., "Aerobic Metabolism of Trichloroethylene by a Bacterial Isolate," *Applied and Environmental Microbiology*, Aug. 1986, p. 383-384, vol. 52.

Little et al., "Trichloroethylene Biodegradation by a Methane-Oxidizing Bacterium," *Applied and Environmental Microbiology*, Apr. 1988, p. 951-956, vol. 54.

Wilson et al., "Biological Treatment of Trichloroethylene and 1,1,1-Trichloroethane from Contaminated Air Streams," *Proceedings of Petroleum Hydrocarbons and Organic Chemicals in Ground Water: Prevention, Detection and Restoration* (The Westin Galleria, Houston, Nov. 9-11, 1988), p. 823-831, published in 1989, vol. 2.

Arciero et al. "Degradation of Trichloroethylene by the Ammonia-Oxidizing Bacterium *Nitrosomonas Europaea*," *Biochemical and Biophysical Research Communications*, Mar. 15, 1989; p. 640-643, vol. 159, No. 2.

Oldenhuis et al., "Degradation of Chlorinated Aliphatic Hydrocarbons by *Methylosinus trichosporium* OB3b Expressing Soluble Methane Monooxygenase," *Applied and Environmental Microbiology*, Nov. 1989; p. 2819-2826, vol. 55, No. 11.

Wackett et al., Survey of Microbial Oxygenases: Trichloroethylene Degradation by Propane-Oxidizing Bacteria, *Applied and Environmental Microbiology*, Nov. 1989, p. 2960-2964, vol. 55, No. 11.

Tsien et al., "Biodegradation of Trichloroethylene by *Methylosinus trichosporium* OB3b," *Applied and Environmental Microbiology*, Dec. 1989; p. 3155-3161, vol. 55, No. 12.

Vannelli et al., "Degradation of Halogenated Aliphatic Compounds by the Ammonia-Oxidizing Bacterium *Nitrosomonas europaea*," *Applied and Environmental Microbiology*, Apr. 1990; p. 1169-1171, vol. 56, No. 4.

Folsom et al. "Phenol and Trichloroethylene Degradation by *Pseudomonas cepacia* G4: Kinetics and Interactions Between Substrates," *Applied and Environmental Microbiology*, May 1990; p. 1279-1285, vol. 56, No. 5.

Broholm et al., "Toxicity of 1,1,1-Trichloroethane and Trichloroethene on a Mixed Culture of Methane-Oxidizing Bacteria", *Applied and Environmental Microbiology*, Aug. 1990, p. 2488-2493, vol. 56, No. 8.

Henry et al., "Influence of Endogenous and Exogenous Electron Donors and Trichloroethylene Oxidation Toxicity on Trichloroethylene Oxidation by Methanotrophic Cultures from a Groundwater Aquifer," *Applied and Environmental Microbiology*, Jan. 1991; p. 236-244, vol. 57, No. 1.

Oldenhuis et al., "Kinetics of Chlorinated Hydrocarbon Degradation by *Methylosinus trichosporium* OB3b and Toxicity of Trichloroethylene," *Applied and Environmental Microbiology*, Jan. 1991; p. 7-14, vol. 57, No. 1.

Alvarez-Cohen et al., "Product Toxicity and Cometabolic Competitive Inhibition Modeling of Chloroform and Trichloroethylene Transformation by Methanotrophic Resting Cells," *Applied Environmental Microbiology*, Apr. 1991; p. 1031-1037, vol. 57, No. 4.

Fox, Status and Trends in Bioremediation Treatment Technology, *Remediation*, Summer 1991, p. 293-303.

Mohn et al., "Reductive Dehalogenation of Chlorophenols by *Desulfomonile tiedjei* DCB-1" *Applied and Environmental Microbiology*, Apr. 1992, p. 1367-1370, vol. 58, No. 4. [ABSTRACT].

Ye et al., "Anaerobic Dechlorination of Polychlorobiphenyls (Aroclor 1242) by Pasteurized and Ethanol-Treated Microorganisms from Sediments", *Applied and Environmental Microbiology*, Apr. 1992, p. 1110-1114, vol. 58, No. 4. [ABSTRACT].

Alvarez-Cohen et al., Characterization of a Methane-Utilizing Bacterium from a Bacterial Consortium That Rapidly Degrades Trichloroethylene and Chloroform, *Applied and Environmental Microbiology*, Jun. 1992, p. 1886-1893, vol. 58, No. 6.

De Bruin et al., "Complete Biological Reductive Transformation of Tetrachloroethene to Ethane", *Applied and Environmental Microbiology*, Jun. 1992, p. 1996-2000, vol. 58, No. 6. [ABSTRACT].

Mohn et al., "Limited Degradation of Chlorophenols by Anaerobic Sludge Granules", *Applied and Environmental Microbiology*, Jul. 1992, p. 2131-2136, vol. 58, No. 7. [ABSTRACT].

Nicholson et al., "Reductive Dechlorination of Chlorophenols by a Pentachlorophenol-Acclimated Methanogenic Consortium", *Applied and Environmental Microbiology*, Jul. 1992, p. 2280-2286, vol. 58, No. 7. [ABSTRACT].

Madsen et al., "Isolation and Characterization of an Anaerobic Chlorophenol-Transforming Bacterium", *Applied and Environmental Microbiology*, Sep. 1992, p. 2874-2878, vol. 58, No. 9. [ABSTRACT].

Locher et al., "Uptake of 4-Toluene Sulfonate by *Comamonas testosteroni* T-2", *J. Bacteriol.*, Feb. 1993, p. 1075-1080, vol. 175, No. 4. [ABSTRACT].

Haggblom et al., "Influence of Alternative Electron Acceptors on the Anaerobic Biodegradability of Chlorinated Phenols and Benzoic Acids," *Applied and Environmental Microbiology*, Apr. 1993; p. 1162-1167, vol. 59, No. 4. [ABSTRACT].

Holliger et al., "A Highly Purified Enrichment Culture Couples the Reductive Dechlorination of Tetrachloroethene to Growth", *Applied and Environmental Microbiology*, Sep. 1993, p. 2991-2997, vol. 59. No. 9. [ABSTRACT].

Ramanand et al., "Reductive Dehalogenation of Chlorinated Benzenes and Toluenes Under Methanogenic Conditions," *Applied and Environmental Microbiology*, Oct. 1993; p. 3266-3272, vol. 59, No. 10. [ABSTRACT].

Zobnina et al., "Sorption of Heavy Metals by a Methane-Oxidizing Culture," *Biotekhnologia*, 1993, p. 55-56, No. 11-22 (Abstract).

Baker et al., *Bioremediation*, pp. 303-304, McGraw-Hill, Inc., 1994.

Jenkins et al., "Methanotrophic Bacteria and Facilitated Transport of Pollutants in Aquifer Material," *Appl. Environ. Microbiol.*, 1994, p. 3491-3498, vol. 60, No. 10 (Abstract).

Cole et al., "Isolation and Characterization of a Novel Bacterium Growing Via Reductive Dehalogenation of 2-Chlorophenol", *Applied and Environmental Microbiology*, Oct. 1994, p. 3536-3542, vol. 60, No. 10. [ABSTRACT].

Chang et al., Transformation Capacities of Chlorinated by Mixed Cultures Enriched on Methane, Propane, Toluene, or Phenol, *Biotechnology and Bioengineering*, Nov. 9, 1994, p. 440-449, vol. 45.

Hur et al., "Metabolism of Chlorofluorocarbons and Polybrominated Compounds by *Pseudomonas putida* G786(pHG-2) via an Engineered Metabolic Pathway", *Applied and Environmental Microbiology*, Nov. 1994, p. 4148-4154, vol. 60, No. 11. [ABSTRACT].

Fish et al., "Biotransformations of Aroclor 1242 in Hudson River Test Tube Microcosms", *Applied and Environmental Microbiology*, Dec. 1994, p. 4289-4296, vol. 60, No. 12. [ABSTRACT].

Sanford et al., "Characterization of Desulfitobacterium chlororespirans sp. nov., Which Grows by Coupling the Oxidation of Lactate to the Reductive Dechlorination of 3-chloro-4-hydroxybenzoate", *Applied and Environmental Microbiology*, Oct. 1996, p. 3800-3808, vol. 62, No. 10. [ABSTRACT].

Kim et al., Aerobic Cometabolism of Chloroform and 1,1,1-Trichloroethane by Butane-Grown Microorganisms, *Bioremediation Journal*, 1997, p. 135-148, vol. 1, No. 2.

Laue et al., "Taurine Reduction in Anaerobic Respiration of Bilophila wadsworthia RZATAU", *Applied and Environmental Microbiology*, May 1997, p. 2016-2021, vol. 63, No. 5. [ABSTRACT].

Coates et al., "Anaerobic Degradation of Polycyclic Aromatic Hydrocarbons and Alkanes in Petroleum-Contaminated Marine Harbor Sediments", *Applied and Environmental Microbiology*, Sep. 1997, p. 3589-3593, vol. 63, No. 9. [ABSTRACT].

Hamamura et al., Chloroform Cometabolism by Butane-Grown CF8, *Pseudomonas butanovora*, and *Mycobacterium vaccae* JOB5 and Methane-Grown *Methylosinus trichosporium* OB3b, *Applied and Environmental Microbiology*, Sep. 1997, p. 3607-3613, vol. 63, No. 9.

Steffan et al., Biodegradation of the Gasoline Oxygenates Methyl tert-Butyl Ether, Ethyl tert-Butyl Ether, and tert-Amyl Methyl Ether by Propane-Oxidizing Bacteria, *Applied and Environmental Microbiology*, Nov. 1997, p. 4216-4222, vol. 63, No. 11.

Bedard et al., "Complete Reductive Dehalogenation of Brominated Biphenyls by Anaerobic Microorganisms in Sediment", *Applied and Environmental Microbiology*, Mar. 1998, p. 940-947, vol. 64, No. 3. [ABSTRACT].

Wu et al., "Microbial Reductive Dechlorination of Aroclor 1260 in Anaerobic Slurries of Estuarine Sediments", *Applied and Environmental Microbiology*, Mar. 1998, p. 1052-1058, vol. 64, No. 3. [ABSTRACT].

Bradley et al., "Anaerobic Oxidation of [1,2-$^{14}$C]Dichloroethene Under Mn(IV)-Reducing Conditions", *Applied and Environmental Microbiology*, Apr. 1998, p. 1560-1562, vol. 64, No. 4. [ABSTRACT].

Bedard et al., "Brominated Biphenyls Prime Extensive Microbial Reductive Dehalogenation of Aroclor 1260 in Housatonic River Sediment", *Applied and Environmental Microbiology*, May 1998, p. 1786-1795, vol. 64, No. 5. [ABSTRACT].

Van Eekert et al., "Degradation and Fate of Carbon Tetrachloride in Unadapted Methanogenic Granular Sludge", *Applied and Environmental Microbiology*, Jul. 1998, p. 2350-2356, vol. 64, No. 7. [ABSTRACT].

Wischnak et al., "*Pseudomonas sp.* Strain 273, an Aerobic α,ω-Dichloroalkane Degrading Bacterium", *Applied and Environmental Microbiology*, Sep. 1998, p. 3507-3511, vol. 64, No. 9. [ABSTRACT].

Dojka et al., "Microbial Diversity in a Hydrocarbon- and Chlorinated-Solvent-Contaminated Aquifer Undergoing Intrinsic Bioremediation", *Applied and Environmental Microbiology*, Oct. 1998, p. 3869-3877, vol. 64, No. 10. [ABSTRACT].

Von Wintzingerode et al., "Phylogenetic Analysis of an Anaerobic, Trichlorobenzene-Transforming Microbial Consortium", *Applied and Environmental Microbiology*, Jan. 1999, p. 283-286, vol. 65, No. 1. [ABSTRACT].

Miguez et al., "Monitoring Methanotrophic Bacteria in Hybrid Anaerobic-Aerobic Reactors with PCR and a Catabolic Gene Probe", *Applied and Environmental Microbiology*, Feb. 1999, p. 381-388, vol. 65, No. 2. [ABSTRACT].

Boyle et al., "Isolation from Estaurine Sediments of a *Desulfovibrio* Strain Which Can Grow on Lactate Coupled to the Reductive Dehalogenation of 2,4,6-Tribromophenol", *Applied and Environmental Microbiology*, Mar. 1999, p. 1133-1140, vol. 65, No. 3. [ABSTRACT].

Wiegel et al., "Anaerobic Dehalogenation of Hydroxylated Polychlorinated Biphenyls by *Desulfitobacterium dehalogenans*", *Applied and Environmental Microbiology*, May 1999, p. 2217-2221, vol. 65, No. 5. [ABSTRACT].

Büyüksönmez et al., "Optimization of Stimultaneous Chemical and Biological Mineralization of Perchoethylene," *Applied and Environmental Microbiology*, Jun. 1999; p. 2784-2788, vol. 65, No. 6.

Maymó-Gatell et al., "Reductive Dechlorination of Chlorinated Ethenes and 1, 2-Dichloroethane by '*Dehalococcoides ethenogenes*' 195," *Applied and Environmental Microbiology*, Jul. 1999; p. 3108-3113, vol. 65, No. 7.

So et al., "Isolation and Characterization of a Sulfate-Reducing Bacterium that Anaerobically Degrades Alkanes", *Applied and Environmental Microbiology*, Jul. 1999, p. 2969-2976, vol. 65, No. 7. [ABSTRACT].

Hamamura et al., "Diversity in Butane Monooxygenases Among Butane-Grown Bacteria," *Applied and Environmental Microbiology*, Oct. 1999; p. 4586-4593, vol. 65, No. 10.

So et al., "Initial Reactions in Anaerobic Alkane Degradation by a Sulfate Reducer, Strain AK-01", *Applied and Environmental Microbiology*, Dec. 1999, p. 5532-5540, vol. 65, No. 12. [ABSTRACT].

Wu et al., "Establishment of a Polychlorinated Biphenyl-Dechlorinating Microbial Consortium, Specific for Doubly Flanked Chlorines, in a Defined, Sediment-Free Medium", *Applied and Environmental Microbiology*, Jan. 2000, p. 49-53, vol. 66, No. 1. [ABSTRACT].

EPA, "Sequential Anaerobic/Aerobic Biodegradation of PCE at Watertown, Massachusetts", Cost and Performance Report, Mar. 2000.

Löffler et al., "16S rRNA Gene-Based Detection of Tetrachloroethene-Dechlorinating *Desulfuromonas* and *Dehalococcoides* Species," *Applied and Environmental Microbiology*, Apr. 2000; p. 1369-1374, vol. 66, No. 4.

Sun et al., "Isolation and Characterization of *Desulfovibrio dechloracetivorans* sp. nov., a Marine Dechlorinating Bacterium Growing by Coupling the Oxidation of Acetate to the Reductive Dechlorination of 2-Chlorophenol", *Applied and Environmental Microbiology*, Jun. 2000, p. 2408-2413, vol. 66, No. 6. [ABSTRACT].

Global BioSciences, Inc., "Butane Biostimulation Technologies™ Paired With SVES to Remediate Petroleum Pollutants (Butane BioVenting™)," *Bio-Tech Talk*, vol. 3, Issue 11, Nov. 1, 2001.

* cited by examiner

BIOVENTING REMEDIATION SYSTEM

CROSS-REFERENCE TO RELATED APPLICATION

This application claims the benefit of U.S. Provisional Patent Application Ser. No. 60/403,934 filed Aug. 16, 2002.

FIELD OF THE INVENTION

The present invention relates to remediation of sites contaminated with pollutants such as petroleum pollutants, chlorinated solvents and the like. More particularly, the invention relates to bioventing systems for remediating such sites.

BACKGROUND INFORMATION

Gasoline and other volatile organic compounds such as chlorinated aliphatic hydrocarbons released into the subsurface may become distributed into different phases such as an adsorbed phase (on soil surface), a vapor/volatilization phase (in soil gas), a dissolved phase (in groundwater) and a free phase (e.g., a pure petroleum or chemical product floating on the groundwater table as a light non-aqueous phase liquid (LNAPL) or sinking below the water table as dense non-aqueous phase liquid (DNAPL).

Soil vapor extraction (SVE) is a physical means of removing or reducing concentrations of volatile organic compounds (VOCs) that partition into the vapor phase. SVE technology was developed to remove volatiles from the subsurface. This technology targets the adsorbed, vapor and NAPL phases of the VOCs present in the unsaturated (vadose) portion of the subsurface. Dissolved-phase VOCs found beneath the groundwater table is not directly addressed by using an SVE system.

Remediation by SVE involves applying a vacuum to soils in the unsaturated zone above the water table in order to induce airflow. Contaminated mass removal is achieved by drawing contaminant-free air into the soil void spaces. The contaminant-free air creates a concentration gradient and the compounds diffuse into the air stream. This VOC-laden air is continuously extracted and replaced with contaminant-free air. An additional benefit of SVE is the continuous flow of oxygen into the area where hydrocarbons are adsorbed on the soil. This continuous oxygen supply enhances the biodegradation of the hydrocarbons within the soil matrix.

A typical SVE system consists of one or more vapor extraction wells strategically located. The SVE wells can be placed vertically or horizontally, depending on depth to groundwater and other site-specific characteristics. The piping system is commonly placed underground, primarily to provide extra protection from accidental damage. The piping system usually ends at a common header pipe, which is connected to a blower or a pump depending on the flow and vacuum desired. An air/water separator and or filter is required prior to the vacuum pump in order to protect equipment from moisture and particulates drawn into the system. Discharge from the blower or vacuum pump is either vented to the atmosphere or connected to an off-gas treatment system, depending upon emissions requirements and the nature and extent of VOCs.

SVE alone is not effective for removing heavier material such as diesel fuel, jet fuel or fuel oils, because of the nonvolatile high-molecular weight fractions they contain. Venting techniques have been developed which utilize SVE hardware and vertical piping as a means of introducing or injecting and reinjecting air (oxygen) into the treatment zone. Such venting techniques may be appropriate when the water table is deep and the contaminant has not reached the groundwater.

In-situ air sparging, also known as in-situ air stripping or in-situ volatilization, is a technology utilized to remove VOCs from the subsurface saturated zone. In-situ air sparging, when utilized with an SVE system, may greatly extend the utility of SVE to the saturated zone. Air sparging is a process in which contaminant-free air is injected under pressure (sparged) below the water table of an impacted aquifer system. In air sparging applications, the air injection pressure is the sum of the hydrostatic pressure (also known as breakout pressure), which is a function of submersion depth of the air sparging point, and the air entry pressure of the geologic formation, a function of capillary resistance to pore water displacement.

Volatile compounds exposed to the injected air are transferred to the vapor phase, similar to air stripping. Once captured by an SVE system, the VOC-laden air is transferred to a subsequent emissions treatment system. Air sparging systems must operate in tandem with SVE systems intended to capture this VOC-laden air stream. Implementing an air sparging system without an SVE system can potentially create a net positive pressure in the subsurface, inducing groundwater migration into areas previously less affected by dissolved-phase VOCs. Air sparging systems may also add oxygen to the groundwater, thus accelerating the natural biological decay process.

The primary mechanisms responsible for VOCs removal during operation of air sparging systems are believed to be in-situ stripping of dissolved-phase VOCs, volatilization of dissolved-phase and adsorbed-phase VOCs beneath the water table and in the capillary fringe, and aerobic biodegradation of both dissolved-phase and adsorbed-phase VOCs as a consequence of additional oxygen supplied by the injected air. When an air sparging system is optimized for stimulating biodegradation, it is sometimes referred to as biosparging. Typically biosparging systems are initially operated for volatilization and stripping. The system is then fine-tuned for enhancement of biodegradation.

SUMMARY OF THE INVENTION

The present invention provides bioventing systems which create a bacterial treatment zone at a contaminated site by supplying a hydrocarbon food source to the treatment zone, and recirculating the hydrocarbon to the treatment zone. The bioventing systems may inject, circulate, extract and reinject hydrocarbons such as butane to the subsurface at a contaminated site to create a bacterial treatment zone. In one embodiment, contaminated vapors extracted from the soil and/or groundwater are reintroduced into the site. Hydrocarbons that are not consumed by the bacteria in the treatment zone may be extracted and recovered for recirculation into the treatment zone. Butane is a particularly preferred hydrocarbon food source which stimulates the growth of butane-utilizing bacteria. However, other hydrocarbons, such as other alkanes and the like, may be used as a bacterial food source in addition to butane or in place of butane.

The bioventing system may be used to recirculate butane and/or other hydrocarbons at various locations such as in the unsaturated zone (above the water table), below the water table and/or at the capillary fringe (water table interface). The bioventing system may be used to remediate and restore contaminated soil and/or groundwater. When used to remediate soil alone, the butane may be reinjected above the water table. For arid or dry soils, it may be desirable to inject water in sufficient amounts to provide moisture to promote bacterial growth.

An aspect of the present invention is to provide a bioventing system comprising a source of hydrocarbon, an injector in flow communication with the source of hydrocarbon and a treatment zone, and an extraction vent communicating with the treatment zone.

Another aspect of the present invention is to provide a method of remediating a contaminated site comprising introducing a hydrocarbon bacterial food source to a treatment zone of the site, and extracting at least a portion of the hydrocarbon food source from the treatment zone.

These and other aspects of the present invention will be more apparent from the following description.

DETAILED DESCRIPTION

Figure 1:
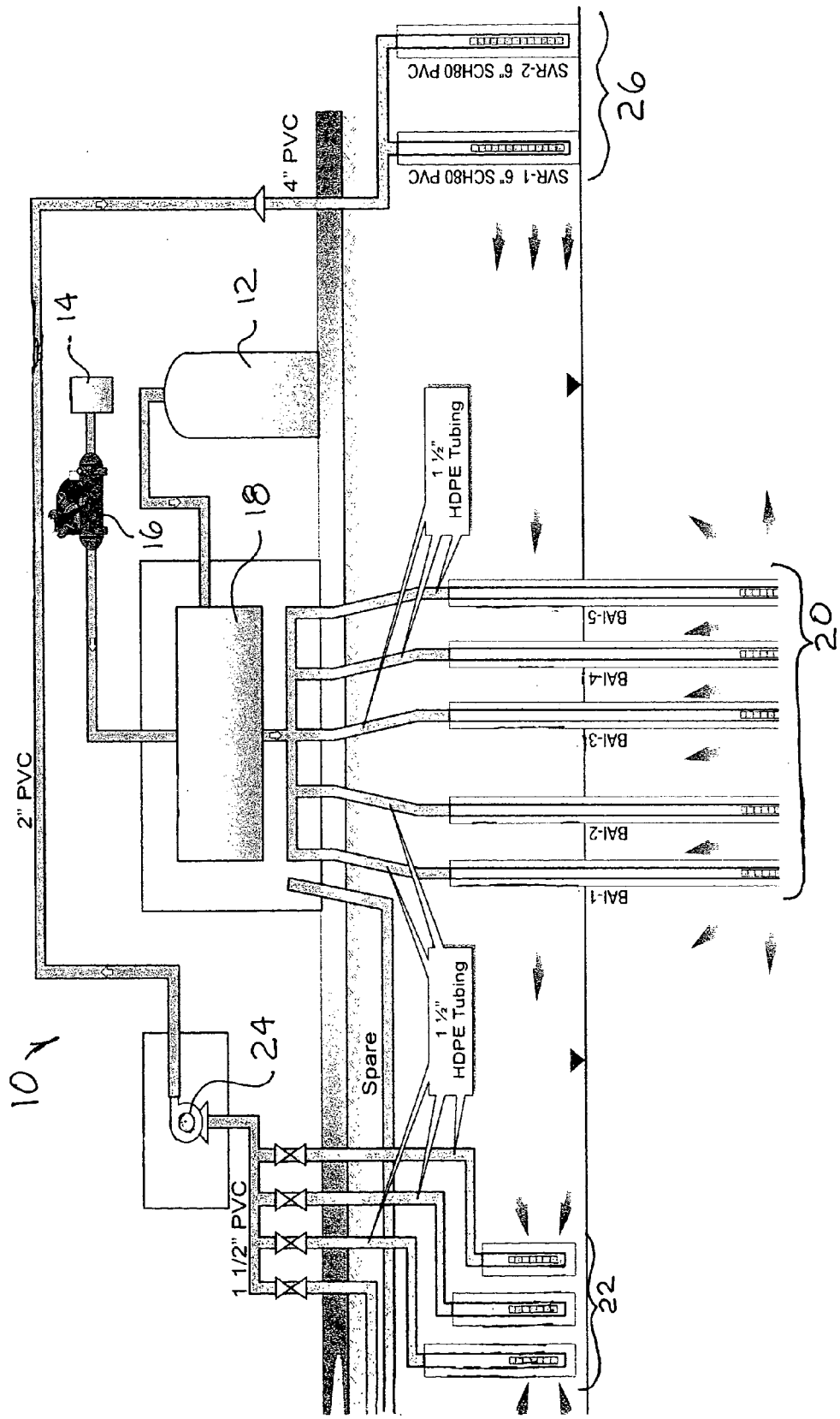
FIG. 1 is partially schematic elevation view of a bioventing system in accordance with an embodiment of the present invention.

FIG. 1 schematically illustrates a bioventing system 10 in accordance with an embodiment of the present invention. The bioventing system 10 includes a supply of butane 12 or other hydrocarbon bacterial food source and an air intake 14 connected to a compressor 16. Butane and air are fed to a mixing panel 18 which controls the flow of the butane and air to injection wells 20 in the treatment zone. Extraction wells 22 recover a portion of the butane as well as other liquids or gases from the treatment zone. A blower 24 is used to recirculate the recovered materials back to the treatment zone via recirculation injectors 26.

In one embodiment, the butane injection system may operate concurrently with an extraction system, such as a SVE system which is used to maintain a vacuum within vadose zone soils. Effluent from the SVE system may be piped back into the biobutane treatment zone, thus allowing vapor control while reducing operation costs by eliminating the need for carbon replacement or regeneration and by recycling the butane gas. The SVE system may further oxygenate the soil, resulting in enhanced microbial degradation of pollutants such as petroleum compounds. Butane injection may also be applied to traditional bioventing systems that are simply recirculating air into a treatment zone.

The following examples illustrate various aspects of the invention, and are not intended to limit the scope of the invention.

EXAMPLE 1

A butane injection panel was installed at a petroleum contaminated service station in Massachusetts. Three years prior to the installation, the site soil and groundwater were impacted by a release from a leak in a product line associated with a UST. The release also produced gasoline vapors that were detected in a building adjacent to the property. Drilling activities revealed the presence of VOCs in soil and contaminants on the water table. Initially, attempts were made to remediate the site by removing material via an ORS product recovery well and product recovery tank, as well as removal of 500 yards of contaminated soil, followed by installation of a conventional soil vapor extraction (SVE) system. The SVE system operated for 18 months and was shut down without successful remediation of the site. Subsequently, a biofeasibility study was conducted using site-specific groundwater. The data obtained from the study confirmed that butane-utilizing bacteria capable of effectively degrading the target pollutants existed at the site.

A butane injection system was then combined with the existing SVE system, as illustrated in FIG. 1. The butane injection system may be similar to those described in U.S. Pat. Nos. 5,888,396, 6,051,130, 6,110,372, 6,156,203, 6,210,579, 6,244,346 and 6,245,235, which are incorporated herein by reference. The butane injection system is used to stimulate the growth of butane-utilizing bacteria which degrade pollutants in the treatment zone. Examples of butane-utilizing bacteria are described in the aforementioned patents. The butane injection system may operate concurrently with the SVE system, which is used to maintain a vacuum within vadose zone soils to control potential migration of VOCs from the treatment area into adjacent buildings. The SVE system was converted to operate as a bioventing system to further oxygenate soils resulting in enhanced microbial degradation of petroleum compounds in the capillary fringe and vadose zone. The off-gas from the system is piped back into the biobutane treatment zone, thus allowing vapor control while reducing the overall operation and maintenance costs by eliminating the need for carbon replacement or regeneration, and by recycling the butane or other hydrocarbon gas.

Figure 2:
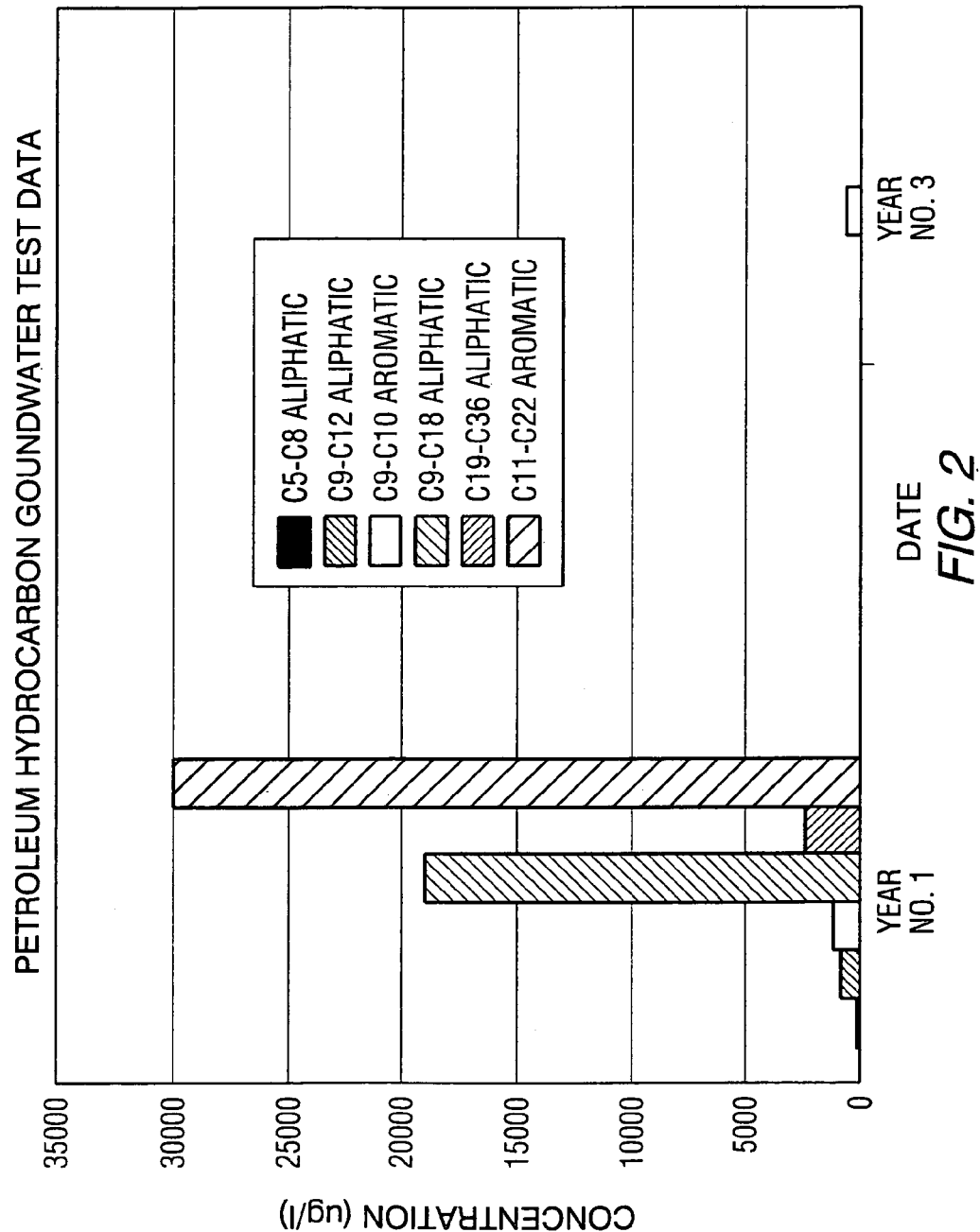
FIGS. 2 and 3 are graphs illustrating petroleum contaminant levels at a site treated with a bioventing system as shown in FIG. 1, before and after treatment with the bioventing system.
Figure 3:
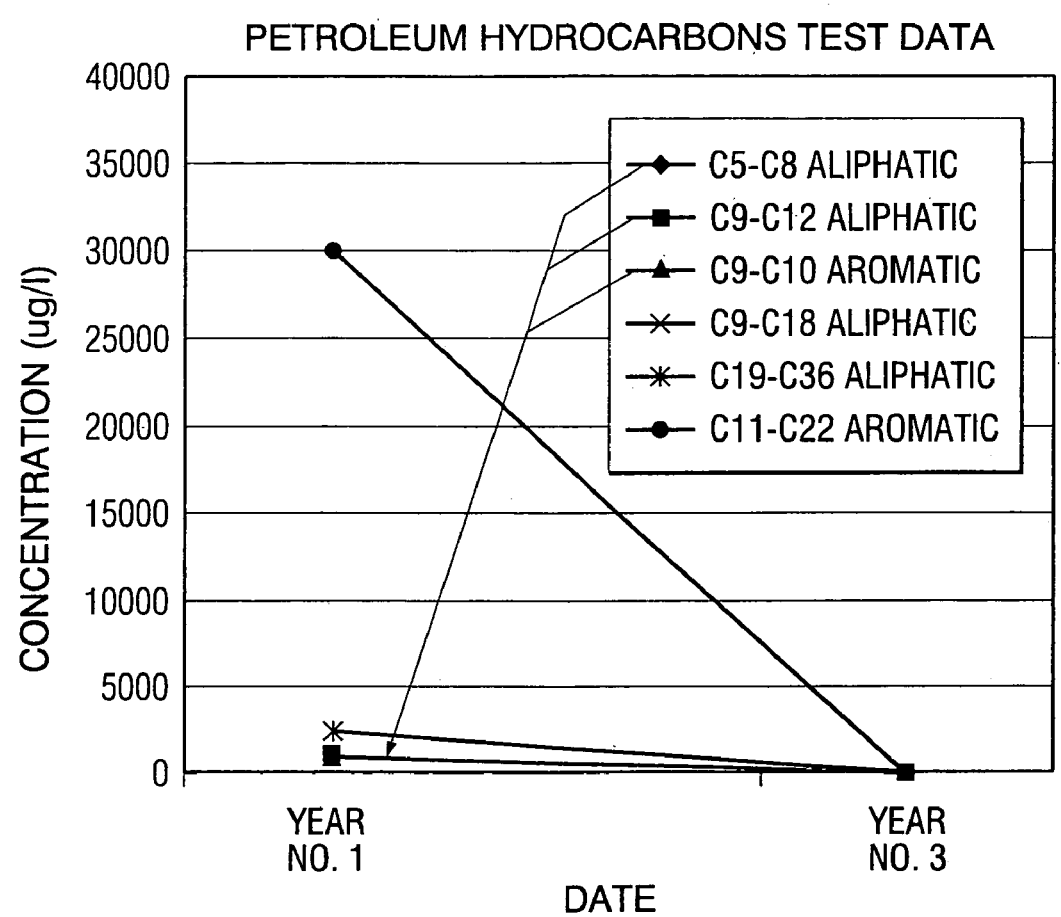

Table 1 and FIGS. 2 and 3 show the results of the bioventing process.

TABLE 1

| | Groundwater Test Data | | | | | |
|---|---|---|---|---|---|---|
| | C5-C8 Aliphatic | C9-C12 Aliphatic | C9-C10 Aromatic | C9-C18 Aliphatic | C19-C36 Aliphatic | C11-C22 Aromatic |
| Initial Levels | 54 | 830 | 1200 | 19000 | 2400 | 30000 |
| Final Levels | 0 | 0 | 583 | 0 | 0 | 0 |

EXAMPLE 2

Figure 4:
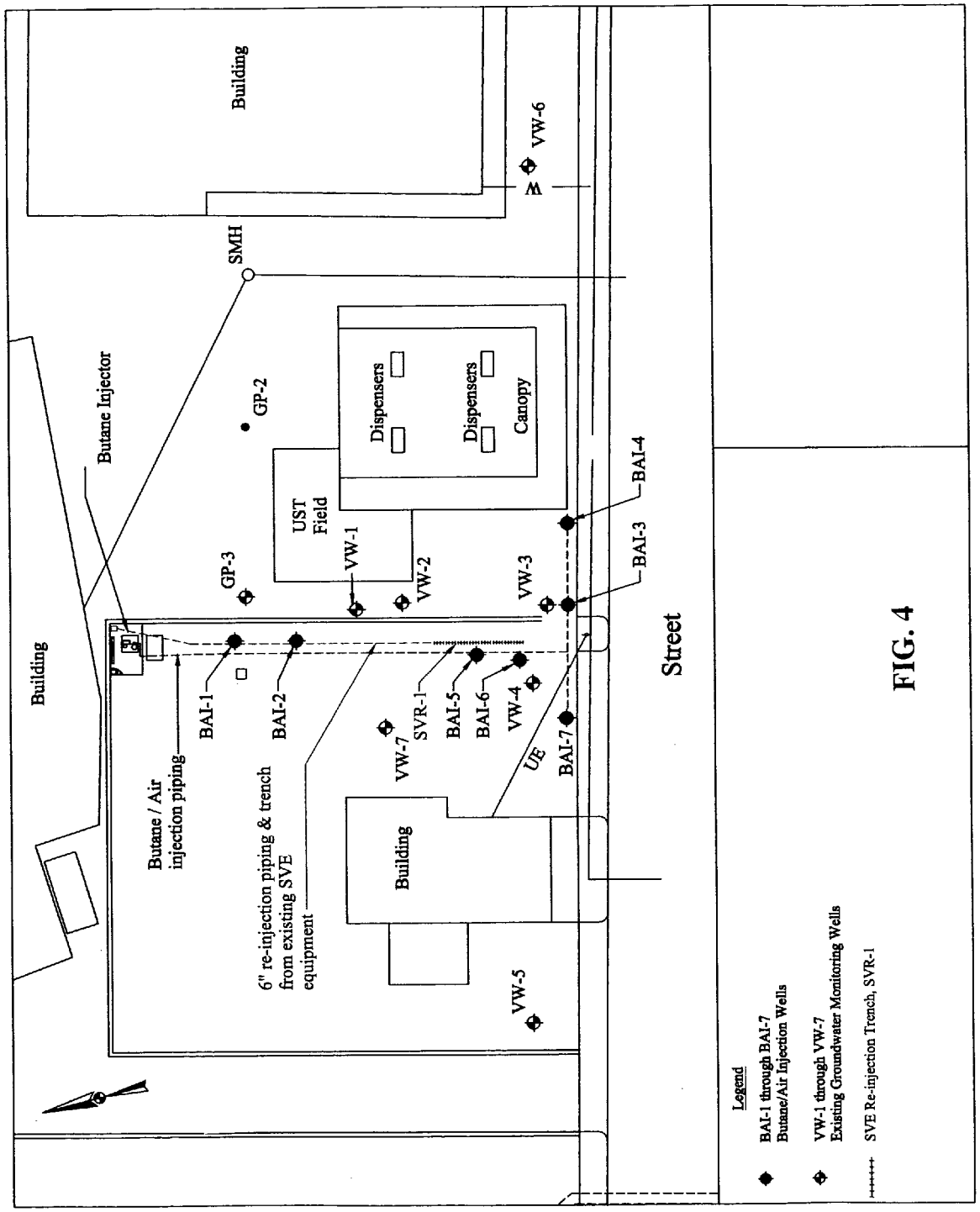
FIG. 4 is a partially schematic plan view of a bioventing system in accordance with another embodiment of the present invention.

A total of six butane/air sparge wells were installed in a treatment area as illustrated in FIG. 4. Each butane/air sparge well may consist of 1-inch or 1¼-inch inside diameter, black iron pipe or Schedule 80 PVC fitted with a 2-foot slotted screen, advanced from the ground surface to a clay deposit identified across the site at a depth of 9 feet below grade. FIG. 4 illustrates the location of the injection wells labeled BAI-1 through BAI-6.

These wells were piped to a butane injector located in a treatment shed in the northern portion of the site, as shown in FIG. 4. An objective of the injection system is to oxygenate the groundwater without the customary effects and contaminant dispersal associated with aggressive air-sparging programs. The butane injector pulses butane gas at a selected volume into the flow stream of an air sparging well supplied with air by a compressor. The airflow was controlled to each well using valves. The airflow rate in each air sparge well is anticipated to vary between 3 and 5 cubic feet per minute. In addition, it is anticipated that in order to generate a dissolved butane concentration in groundwater of 10 to 20 ppm in the treatment zone, approximately 2.0 lbs (site total) of liquid butane was injected (as a gas) into the site aquifer daily (approximately 12.8 ft3).

The SVE system previously installed at the site was operated concurrently with the butane biostimulation treatment system and used to maintain a vacuum within vadose zone soils. The SVE system served as a control for potential migration of volatile organic compounds (VOCs) from the treatment area into adjacent buildings. In addition, the SVE system further oxygenated the soils thus resulting in enhanced microbial degradation of petroleum compounds in the capillary fringe and in the vadose zone. VOCs were monitored in each vapor extraction well using a photoionization detector (PID) during site monitoring visits.

The effluent from the SVE system was piped back into the butane biotreatment zone, as shown in FIG. 4, thus allowing for vapor control while reducing the overall O&M costs by eliminating the need for carbon replacement or regeneration and by recycling the butane gas.

The recirculated effluent from the SVE system was monitored using a PID meter during site visits. The level of VOCs concentration measured by the meter is a very good indication of the effectiveness of the butane biotreatment system with particular emphasis on the soil contamination located in the vadose or unsaturated zone. The results of the effluent screening are summarized in Table 2 below.

TABLE 2

VOCs Content of SVE System Effluent

| Date of Soil Gas Screening | PID Results (ppm) |
|---|---|
| Before Butane Bioventing | 690 |
| 4 Months After Initiation of Butane Bioventing | 95 |
| 7 Months After Initiation of Butane Bioventing | 93 |

The results clearly indicate that the VOCs concentrations in the soil gas were significantly decreased by continuous reinjection into the butane biotreatment zone established in the vadose zone soils. The soil gas represents the SVE system blower effluent prior to reinjection into the subsurface. This is the soil gas effluent normally piped into granular activated carbon canisters for treatment and eventual disposal.

Table 3 is a summary of the groundwater quality data from the site. Butane bioventing was initiated in Month No. 7. Significant improvements in groundwater quality were achieved. It is noted that the GP-3 monitoring well was believed to be located upgradient of the treatment zone of influence.

TABLE 3

Summary of Groundwater Quality Data (System Startup Month No. 7)

| Sample Location | Analytical Method | Benzene | Ethylbenzene | MTBE | Naphthalene | Toluene | Xylenes | C5-C8 Aliphatics | C9-C12 Aliphatics | C9-C10 Aromatics |
|---|---|---|---|---|---|---|---|---|---|---|
| Month No. 1 | | | | | | | | | | |
| GBI-1 | MADEP VPH | ND | ND | 10.1 | ND | ND | ND | ND | ND | ND |
| GBI-2 | MADEP VPH | ND | ND | ND | ND | ND | ND | ND | ND | ND |
| GBI-3 | MADEP VPH | ND | ND | 196 | ND | ND | ND | ND | ND | ND |
| GBI-4 | MADEP VPH | ND | ND | 289 | ND | ND | 122 | 1,460 | 1,140 | ND |
| VW-1 | MADEP VPH | ND | ND | 15,700 | ND | 120 | 2,404 | 22,600 | 27,800 | 2.440 |
| VW-2 | MADEP VPH | ND | 1,510 | 109,000 | ND | 504 | 4,090 | 37,600 | 46,900 | ND |
| VW-3 | MADEP VPH | 2,170 | 3,130 | 12,700 | ND | 34,600 | 18,110 | ND | 12,200 | ND |
| VW-4 | MADEP VPH | 247 | 1,540 | 2,500 | 517 | 799 | 10,250 | 6,610 | ND | 5,260 |
| VW-6 | MADEP VPH | 942 | 1,260 | 7,800 | 332 | 85.8 | 3,740 | 18,500 | 8,470 | 3.800 |
| VW-7 | MADEP VPH | ND | ND | 6.13 | ND | ND | ND | ND | ND | ND |
| TRIP | MADEP VPH | ND | ND | ND | ND | ND | ND | ND | ND | ND |
| GP-3 | MADEP VPH | 1,380 | 689 | 140,000 | 473 | 9,740 | 17,520 | ND | ND | 6,770 |
| Month No. 5 | | | | | | | | | | |
| GBI-1 | MADEP VPH | ND | ND | ND | ND | ND | ND | ND | ND | ND |
| GBI-2 | MADEP VPH | ND | ND | ND | ND | ND | ND | ND | ND | ND |
| GBI-3 | MADEP VPH | ND | ND | 41 | ND | ND | ND | ND | ND | ND |
| GBI-4 | MADEP VPH | ND | ND | 200 | ND | ND | ND | 220 | 19 | 160 |
| VW-1 | MADEP VPH | ND | ND | 16,000 | ND | ND | ND | ND | 930 | ND |
| VW-2 | MADEP VPH | 400 | ND | 24,000 | ND | ND | 580 | 620 | 2,400 | 960 |
| VW-3 | MADEP VPH | 130 | 300 | 72 | 130 | 3,200 | 1,590 | 4,800 | 310 | 1,900 |
| VW-4 | MADEP VPH | 360 | 1,600 | 7,100 | 340 | 440 | 9,600 | 1,700 | 3,600 | 10,000 |
| VW-6 | MADEP VPH | 690 | 1,500 | 4,500 | 160 | 110 | 3,250 | 1,900 | 1,900 | 6,300 |
| VW-7 | MADEP VPH | ND | ND | ND | ND | ND | ND | ND | ND | ND |
| TRIP | MADEP VPH | ND | ND | ND | ND | ND | ND | ND | ND | ND |
| GP-3 | MADEP VPH | ND | ND | 74,000 | ND | ND | 1,500 | ND | 3,500 | 3,400 |
| Month No. 8 | | | | | | | | | | |
| GBI-1 | MADEP VPH | ND | ND | ND | ND | ND | ND | ND | ND | ND |
| GBI-2 | MADEP VPH | ND | ND | ND | ND | ND | ND | ND | ND | ND |
| GBI-3 | MADEP VPH | ND | ND | 497 | ND | ND | ND | ND | ND | ND |
| GBI-4 | MADEP VPH | 26.8 | ND | 923 | 24.9 | 5.7 | 14.4 | ND | 81.6 | 301 |
| VW-1 | MADEP VPH | 717 | ND | 10,600 | ND | 14.8 | 321 | ND | ND | 155 |
| VW-2 | MADEP VPH | 1.472 | 292 | 41,900 | 337 | 713 | 4,012 | ND | ND | 3,680 |
| VW-3 | MADEP VPH | 527 | 820 | 770 | 271 | 11,400 | 7,040 | ND | ND | 3,610 |

TABLE 3-continued

Summary of Groundwater Quality Data (System Startup Month No. 7)

| Sample Location | Analytical Method | Benzene | Ethylbenzene | MTBE | Naphthalene | Toluene | Xylenes | C5-C8 Aliphatics | C9-C12 Aliphatics | C9-C10 Aromatics |
|---|---|---|---|---|---|---|---|---|---|---|
| VW-6 | MADEP VPH | 126 | 1,810 | 8,700 | 283 | 467 | 3,719 | ND | ND | 3,810 |
| VW-7 | MADEP VPH | 38.2 | ND | 11.5 | ND | ND | 10 | ND | ND | ND |
| TRIP | MADEP VPH | ND | ND | ND | ND | ND | ND | ND | ND | ND |
| GP-3 | MADEP VPH | 4,320 | 1,000 | 83,300 | 947 | 16,900 | 31,900 | ND | ND | 9,440 |
| Month No. 11 | | | | | | | | | | |
| GBI-1 | MADEP VPH | ND | ND | ND | ND | ND | ND | ND | ND | ND |
| GBI-2 | MADEP VPH | ND | ND | ND | ND | ND | ND | ND | ND | ND |
| GBI-3 | MADEP VPH | ND | ND | 1,530 | ND | ND | ND | ND | ND | ND |
| GBI-4 | MADEP VPH | ND | ND | 922 | ND | ND | 62.6 | 908 | ND | ND |
| VW-1 | MADEP VPH | ND | ND | 5,254 | ND | ND | ND | ND | ND | ND |
| VW-2 | MADEP VPH | 216 | ND | 35,200 | ND | 675 | 1,500 | ND | ND | 3,690 |
| VW-3 | MADEP VPH | ND | 771 | 587 | ND | 182 | 753 | ND | ND | 3,220 |
| VW-6 | MADEP VPH | 1,250 | 1,930 | 10,600 | ND | ND | 4,068 | ND | ND | 9,030 |
| VW-7 | MADEP VPH | ND | ND | 56.4 | ND | ND | ND | ND | ND | ND |
| TRIP | MADEP VPH | ND | ND | ND | ND | ND | ND | ND | ND | ND |
| GP-3 | MADEP VPH | 3,950 | 1,610 | 210,000 | ND | 16,600 | 24,750 | ND | ND | 19,600 |
| Month No. 14 | | | | | | | | | | |
| GBI-1 | MADEP VPH | ND | ND | ND | ND | ND | ND | ND | ND | ND |
| GBI-2 | MADEP VPH | ND | ND | ND | ND | ND | ND | ND | ND | ND |
| GBI-3 | MADEP VPH | ND | ND | 6,790 | ND | ND | ND | ND | 15.4 | ND |
| GBI-4 | MADEP VPH | 32 | 28.7 | 2,510 | ND | 58 | 48.7 | ND | 33.6 | 352 |
| VW-1 | MADEP VPH | 5.2 | 5.4 | 103 | 29.3 | ND | 40.9 | ND | ND | 303 |
| VW-2 | MADEP VPH | 551 | 271 | 13,100 | 435 | 44.3 | 1,331 | ND | 1,500 | 4,710 |
| VW-6 | MADEP VPH | 513 | 799 | 5,170 | 418 | 116 | 1,073 | ND | 888 | 3,740 |
| VW-7 | MADEP VPH | ND | ND | 385.0 | ND | ND | ND | ND | 39.4 | ND |
| TRIP | MADEP VPH | ND | ND | ND | ND | ND | ND | ND | ND | ND |
| GP-3 | MADEP VPH | 740 | 958 | 41,400 | ND | 243 | 16,920 | ND | ND | 14,500 |
| GW-2 STANDARD | | 2,000 | 30,000 | 50,000 | 6,000 | 6,000 | 6,000 | 1,000 | 1,000 | 5,000 |
| GW-3 STANDARD | | 7,000 | 4,000 | 50,000 | 6,000 | 50,000 | 50,000 | 4,000 | 20,000 | 4,000 |

All concentrations expressed in µg/l (ppb)
Bold values exceed GW-2 and/or GW-3 Standards
VW-4 was dry on Jan. 24, 2002, Apr. 24, 2002 and Jul. 31, 2002
VW-3 was dry on Jul. 31, 2002

Whereas particular embodiments of this invention have been described above for purposes of illustration, it will be evident to those skilled in the art that numerous variations of the details of the present invention may be made without departing from the invention.

What is claimed is:

1. A system comprising:
   a source of hydrocarbon comprising at least 50 weight percent butane;
   an injector in flow communication with the source of hydrocarbon and an in-situ treatment zone;
   an extraction vent communicating with the in-situ treatment zone; and
   means for recirculating at least a portion of the hydrocarbon to the in situ treatment zone.

2. The system of claim 1, wherein the butane comprises at least 90 weight percent of the hydrocarbon.

3. The system of claim 1, wherein the in situ treatment zone comprises soil.

4. The system of claim 1, wherein the in situ treatment zone comprises groundwater.

5. The system of claim 1, wherein the extraction vent is in flow communication with the injector for recirculating at least a portion of the hydrocarbon to the in situ treatment zone.

6. The system of claim 1, further comprising means for introducing oxygen to the in situ treatment zone.

7. The system of claim 1, further comprising:
   a source of oxygen; and
   an oxygen injector in flow communication with the source of oxygen and the in situ treatment zone.

8. The system of claim 7, wherein the oxygen is provided in the form of air.

9. A system comprising:
   a source of hydrocarbon comprising at least 50 weight percent butane;
   an injector in flow communication with the source of hydrocarbon and an in situ treatment zone; and
   an extraction vent communicating with the in-situ treatment zone, wherein the extraction vent is in flow communication with the injector for recirculating at least a portion of the hydrocarbon to the in situ treatment zone.

* * * * *